US010644861B2

(12) United States Patent
Pehlke

(10) Patent No.: US 10,644,861 B2
(45) Date of Patent: *May 5, 2020

(54) MOBILE DEVICE FRONT END ARCHITECTURE FOR TIME DIVISION DUPLEXING

(71) Applicant: Skyworks Solutions, Inc., Woburn, MA (US)

(72) Inventor: David Richard Pehlke, Westlake Village, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,713

(22) Filed: Dec. 5, 2017

(65) Prior Publication Data

US 2018/0205530 A1 Jul. 19, 2018

Related U.S. Application Data

(63) Continuation of application No. 14/931,253, filed on Nov. 3, 2015, now Pat. No. 9,866,366.

(60) Provisional application No. 62/076,100, filed on Nov. 6, 2014, provisional application No. 62/095,292, filed on Dec. 22, 2014.

(51) Int. Cl.
*H04L 5/14* (2006.01)
*H04B 1/00* (2006.01)

(52) U.S. Cl.
CPC ............ *H04L 5/14* (2013.01); *H04B 1/0057* (2013.01); *H04L 5/1469* (2013.01)

(58) Field of Classification Search
CPC . H04W 16/14; H04W 88/06; H04W 72/1215; H04W 72/0453; H04W 72/042; H04W 72/0413; H04W 76/048; H04L 5/14; H04L 5/0007; H04L 5/001; H04L 5/1469; H04L 5/0005; H04L 5/0026; H04L 5/0023; H04L 5/22; H04L 5/0053; H04B 7/2615; H04B 7/2618; H04B 7/2621; H04B 1/0057; H03H 9/725; H03H 9/706
See application file for complete search history.

(56) References Cited

U.S. PATENT DOCUMENTS 5,881,369 A 3/1999 Dean et al.
8,971,220 B2 3/2015 Reed et al.
(Continued)

FOREIGN PATENT DOCUMENTS

JP 2014-526847 A 10/2014

OTHER PUBLICATIONS

International Search Report and Written Opinion dated Mar. 31, 2016 for International Application No. PCT/US2015/059322.

*Primary Examiner* — Peter Chen
(74) *Attorney, Agent, or Firm* — Knobbe, Martens, Olson & Bear, LLP

(57) ABSTRACT

A switching circuit for use in a frequency division duplex (FDD) spectrum re-allocated for time division duplex (TDD) applications comprises a first filter configured to filter a TDD receive signal, a duplex filter configured to filter an FDD receive signal, and a plurality of switches configured to route the FDD receive signal from an antenna through the duplex filter to receiver circuitry and to route the TDD receive signal from the antenna through the first filter to the receiver circuitry such that the FDD and TDD receive signals share the FDD spectrum.

20 Claims, 9 Drawing Sheets

(56) References Cited

U.S. PATENT DOCUMENTS

| | | |
|---|---|---|
| 9,866,366 B2 | 1/2018 | Pehlke |
| 2002/0016183 A1 | 2/2002 | Lehtinen |
| 2010/0118744 A1 | 5/2010 | Kwon |
| 2010/0124183 A1* | 5/2010 | Sorond ................ H04B 7/2615 370/280 |
| 2012/0082038 A1 | 4/2012 | Xu et al. |
| 2012/0099558 A1* | 4/2012 | Skov ..................... H04W 16/12 370/329 |
| 2012/0243447 A1 | 9/2012 | Weissman et al. |
| 2013/0135043 A1 | 5/2013 | Hietala |
| 2013/0244722 A1 | 9/2013 | Rousu |
| 2013/0343244 A1 | 12/2013 | Hui et al. |

\* cited by examiner

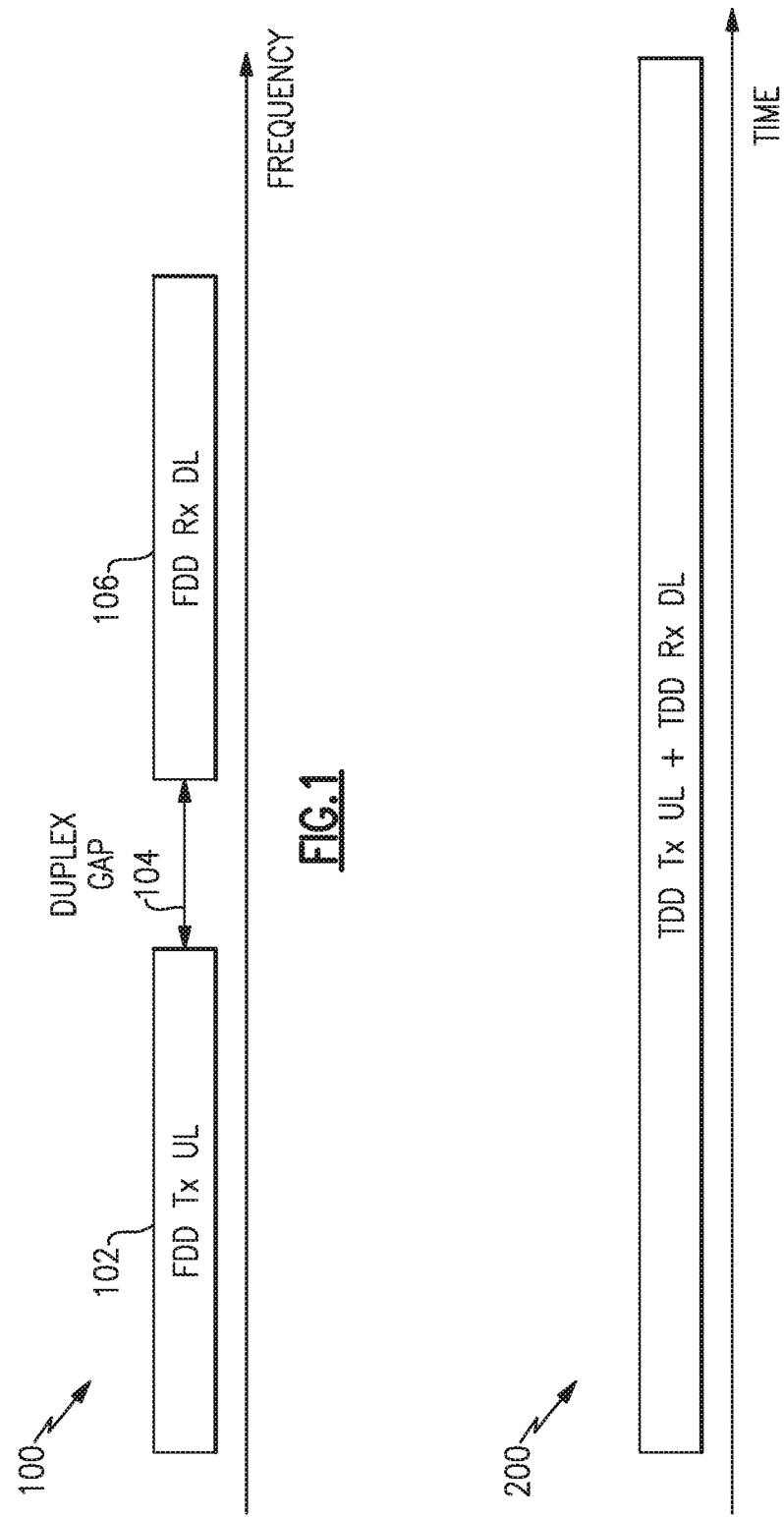

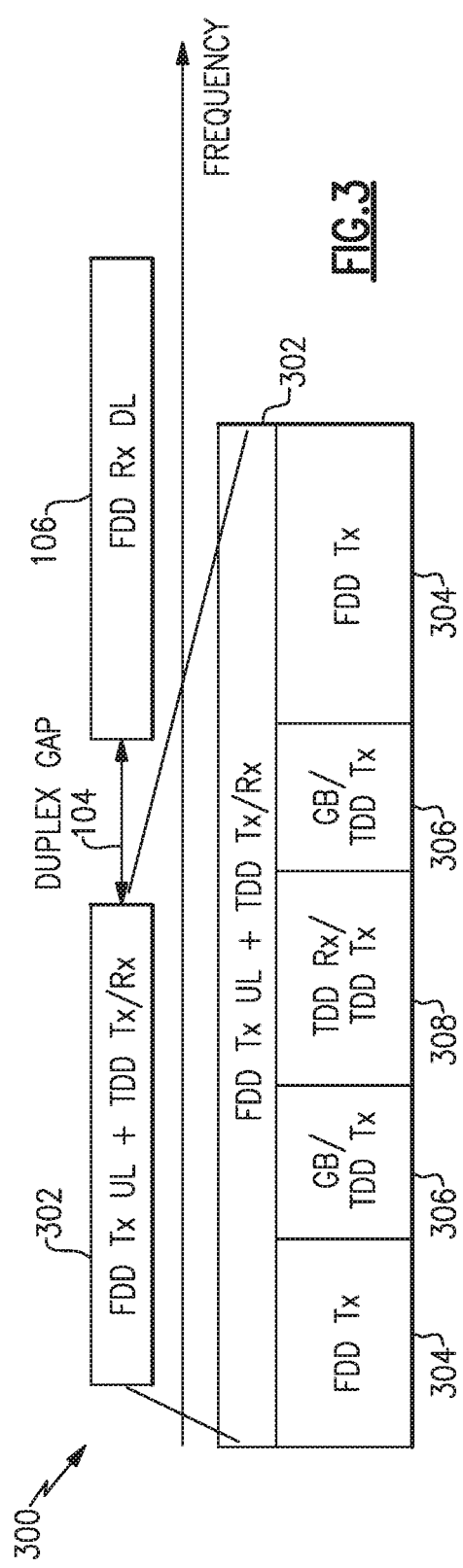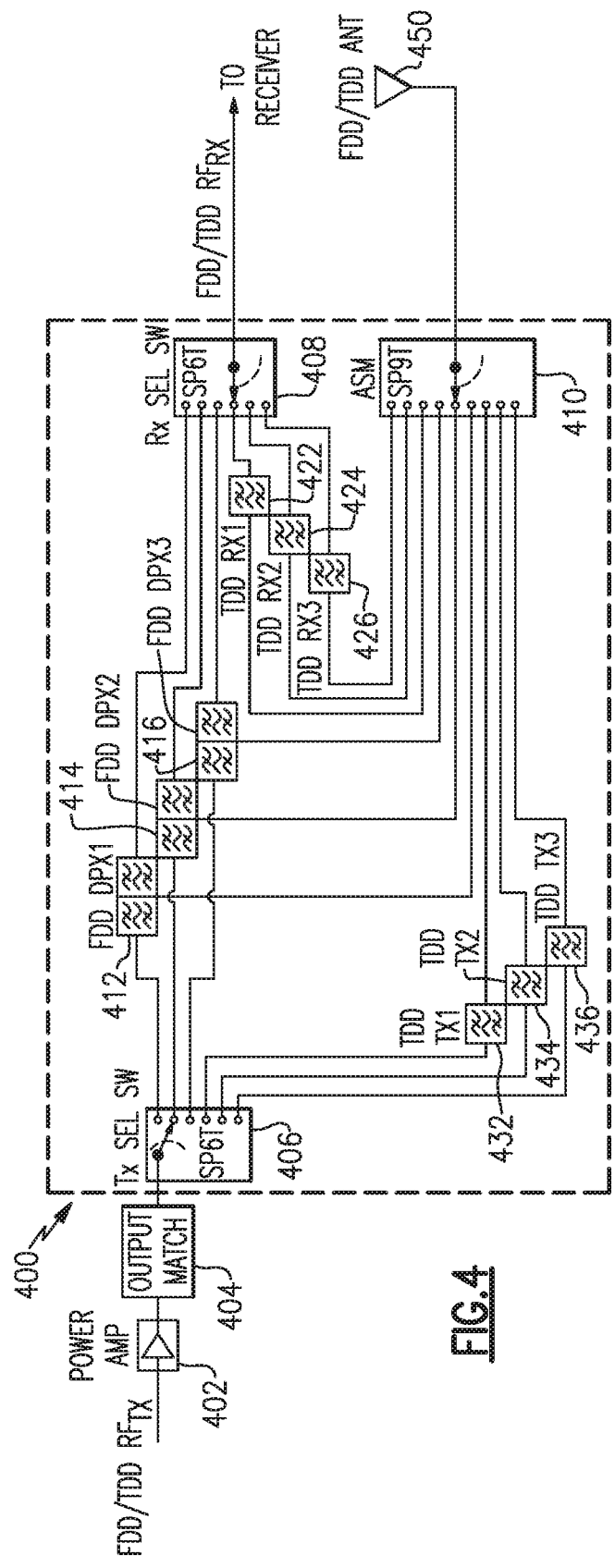

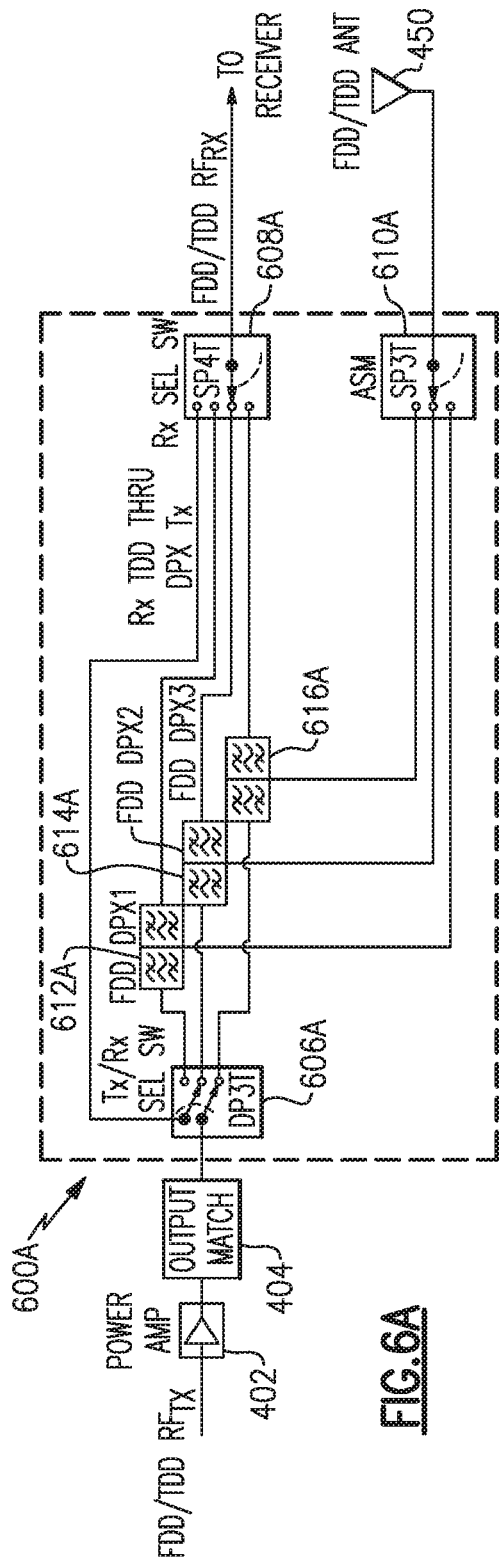
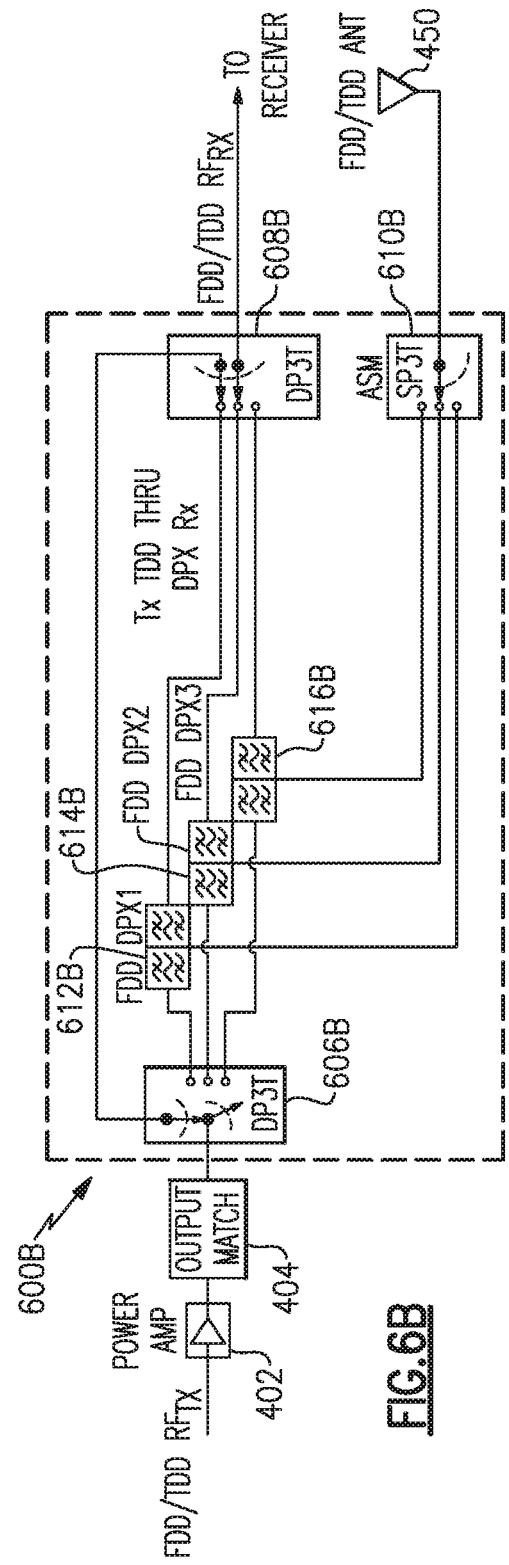

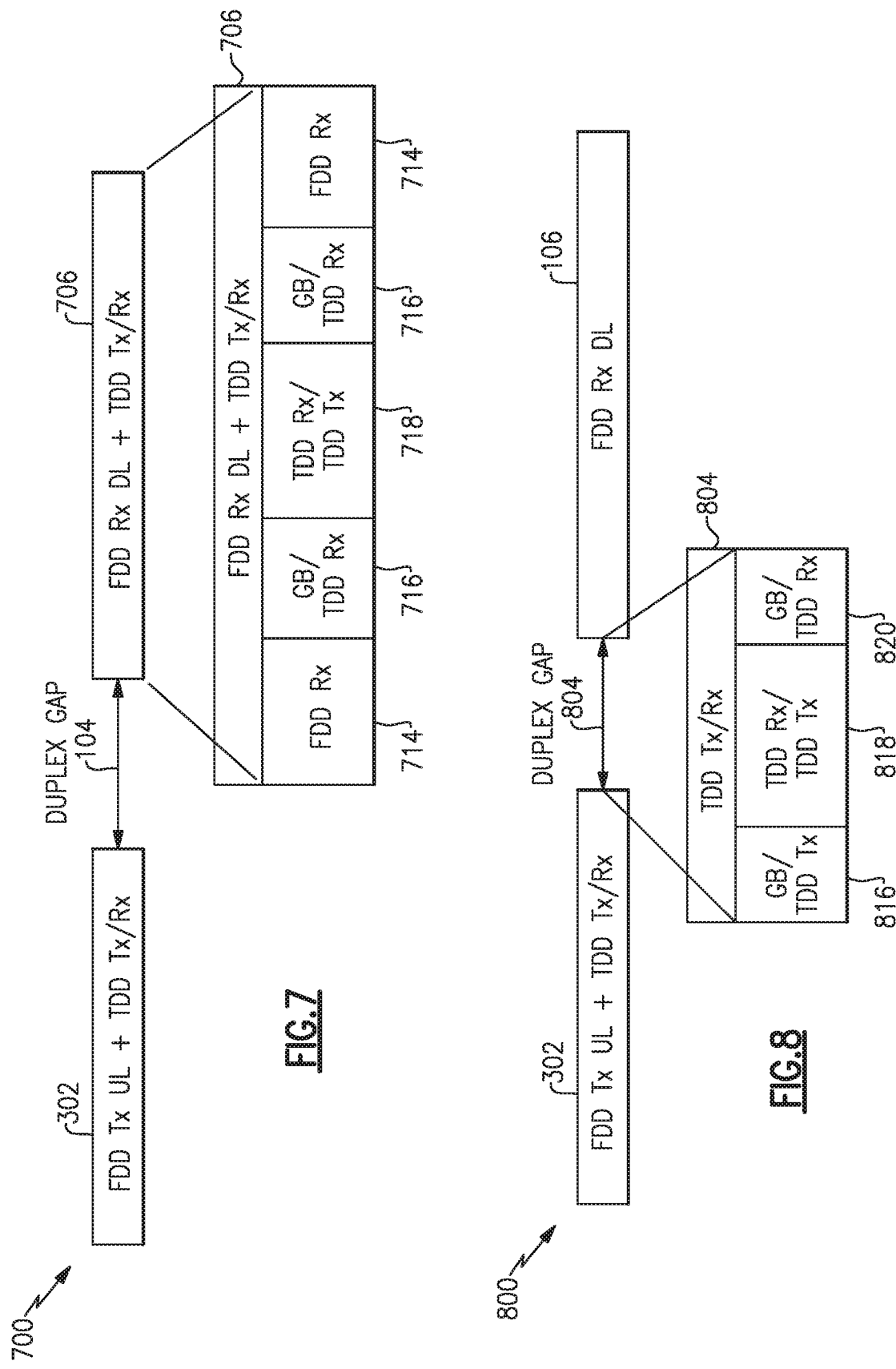

MOBILE DEVICE FRONT END ARCHITECTURE FOR TIME DIVISION DUPLEXING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention is generally in the field of radio communications, and more particularly, to reallocating of the frequency spectrum.

Description of the Related Art

Frequency Division Duplex (FDD) is a method of two-way radio communication where devices on one end transmit using one radio frequency, while devices on the other end transmit using a different frequency. This paired unit of radio frequency (RF) spectrum allows simultaneous two-way communication without interference. For example, this is how most cellular phone networks are designed. Cellular phones transmit to network towers using one frequency, while network towers transmit to phones on a different frequency. As data traffic increases, data capacity is limited by the fixed bandwidths of the paired spectrum.

SUMMARY

Systems and methods are disclosed to use a frequency division duplex (FDD) spectrum that is re-allocated for time division duplex (TDD) applications. A switching circuit comprises a first filter configured to filter a TDD receive signal, a duplex filter configured to filter an FDD receive signal, and a plurality of switches configured to route the FDD receive signal from an antenna through the duplex filter to receiver circuitry and to route the TDD receive signal from the antenna through the first filter to the receiver circuitry such that the FDD and TDD receive signals share the FDD spectrum.

In certain embodiments, a switching circuit used in an FDD spectrum re-allocated for TDD application comprises a first filter configured to filter a TDD receive signal, a duplex filter configured to filter an FDD receive signal, and a plurality of switches configured to route the FDD receive signal from an antenna through the duplex filter to receiver circuitry and to route the TDD receive signal from the antenna through the first filter to the receiver circuitry, where the FDD and TDD receive signals share the FDD spectrum.

In an embodiment, the duplex filter includes a surface acoustic wave (SAW) filter. In another embodiment, the switching circuit further comprises a second filter configured to filter a TDD transmit signal, where the duplex filter is further configured to filter an FDD transmit signal. In a further embodiment, the first filter, the second filter, and the duplex filter include bandpass filters. In a yet further embodiment, the plurality of switches are further configured to route the TDD transmit signal from transmitter circuitry through the second filter to the antenna, and to route the FDD transmit signal from the transmitter circuitry through the duplex filter to the antenna, where the FDD and TDD transmit signals share a first frequency band of the FDD spectrum.

In another embodiment, the TDD transmit, TDD receive, FDD transmit, and FDD receive signals are radio frequency (RF) signals. In another embodiment, a wireless device includes the switching circuit.

According to a number of embodiments, a switching module for use in a frequency division duplex (FDD) spectrum re-allocated for time division duplex (TDD) application comprises a switching circuit implemented in a first semiconductor die, where the switching circuit includes a first filter configured to filter a TDD receive signal, a duplex filter configured to filter an FDD receive signal, and a plurality of switches configured to route the FDD receive signal from an antenna through the duplex filter to receiver circuitry and to route the TDD receive signal from the antenna through the first filter to the receiver circuitry, such that the FDD and TDD receive signals share the FDD spectrum, and at least one of a prefilter circuit, a post filter circuit, a power amplifier circuit, a switch circuit, a down converter circuit, and a modulator circuit implemented in a second semiconductor die.

In an embodiment, the duplex filter includes a surface acoustic wave (SAW) filter. In another embodiment, the switching circuit further includes a second filter configured to filter a TDD transmit signal, the duplex filter further configured to filter an FDD transmit signal. In a further embodiment, the first filter, the second filter, and the duplex filter include bandpass filters. In a yet further embodiment, the plurality of switches are further configured to route the TDD transmit signal from transmitter circuitry through the second filter to the antenna and to route the FDD transmit signal from the transmitter circuitry through the duplex filter to the antenna, where the FDD and TDD transmit signals share a first frequency band of the FDD spectrum.

In an embodiment, the duplex filter includes a film bulk acoustic resonator (FBAR) filter. In another embodiment, the duplex filter includes a bulk acoustic wave (BAW) filter. In a further embodiment, a wireless device includes the switching module.

In accordance with various embodiments, a wireless device for use in FDD spectrum that is re-allocated for TDD application is disclosed. The wireless device comprises an antenna configured to receive an RF input signal and to transmit an RF output signal, a transmitter configured to provide the antenna with the RF output signal, where the RF output signal is one of a TDD transmit signal and an FDD transmit signal, a receiver configured to amplify the received RF input signal, where the received RF input signal being one of a TDD receive signal and an FDD receive signal, and a switching circuit including a first filter configured to filter the TDD receive signal, a duplex filter configured to filter the FDD receive signal, and a plurality of switches configured to route the FDD receive signal from the antenna through the duplex filter to the receiver and to route the TDD receive signal from the antenna through the first filter to the receiver, where the FDD and TDD receive signals share the FDD spectrum.

In an embodiment, the switching circuit further includes a second filter configured to filter the TDD transmit signal, the duplex filter further configured to filter an FDD transmit signal. In another embodiment, the plurality of switches is further configured to route the TDD transmit signal from the transmitter through the second filter to the antenna and to route the FDD transmit signal from the transmitter through the duplex filter to the antenna, where the FDD and TDD transmit signals share a first frequency band of the FDD spectrum.

In certain other embodiments, a method to transmit and receive FDD signals and TDD signals in an FDD and TDD shared frequency band is disclosed. The method comprises routing an FDD receive signal from an antenna to receiver circuitry through a duplex filter configured to filter the FDD receive signal, and routing a TDD receive signal from the antenna to the receiver circuitry through a first filter configured to filter the TDD receive signal, the FDD and TDD receive signals sharing an FDD spectrum.

The method further comprises routing an FDD transmit signal from the transmitter circuitry to the antenna through the duplex filter that is further configured to filter the FDD transmit signal. The method further comprises routing a TDD transmit signal from the transmitter circuitry to the antenna through a second filter configured to filter the TDD transmit signal, where the FDD and TDD transmit signals share the FDD spectrum.

In an embodiment, the duplex filter includes a surface acoustic wave (SAW) filter. In another embodiment, the duplex filter is selected from the group consisting of a surface acoustic wave (SAW) filter, a film bulk acoustic resonator (FBAR) filter, and a bulk acoustic wave (BAW) filter.

In accordance with various other embodiments, an FDD paired spectrum re-apportioned for TDD communications comprises a first frequency band configured to operate as a first downlink for FDD RF signals, and a second frequency band different than the first frequency band, the second frequency band including an FDD transmit portion configured to operate as a first uplink for FDD RF signals, a first TDD portion configured to operate as a second uplink and a second downlink for TDD RF signals, and a dual-use portion.

In an embodiment, the dual-use portion of the second frequency band is configured to operate as a guard band when signal interference between the FDD transmit portion and the TDD portion is greater than a threshold. In another embodiment, the dual-use portion of the second frequency band is further configured to operate as a third uplink for TDD RF signals when the signal interference is less than the threshold. In a further embodiment, the FDD paired spectrum further comprises a gap band configured to operate as a third uplink and a third downlink for TDD RF signals. In a yet further embodiment, the gap band is further configured to operate as one of a guard band and a fourth uplink for TDD RF signals.

In certain other embodiments, a switching circuit for use in an FDD spectrum re-allocated for time TDD application is disclosed. The switching circuit comprises a duplex filter configured to filter RF signals, and a plurality of switches configured to route an FDD receive signal from an antenna through the duplex filter to receiver circuitry, to route a TDD receive signal from the antenna through the duplex filter to the receiver circuitry, to route an FDD transmit signal from transmitter circuitry through the duplex filter to the antenna, and to route a TDD transmit signal from the transmitter circuitry through the duplex filter to the antenna, where the FDD transmit signals, the TDD transmit signals, and the TDD receive signals share a frequency band of the FDD spectrum.

According to a number of other embodiments, a switching circuit for use in an FDD spectrum re-allocated for TDD application is disclosed. The switching circuit comprises a duplex filter configured to filter RF signals, and a plurality of switches configured to route an FDD receive signal from an antenna through the duplex filter to receiver circuitry, to route a TDD receive signal from the antenna through the duplex filter to the receiver circuitry, to route an FDD transmit signal from transmitter circuitry through the duplex filter to the antenna, and to route a TDD transmit signal from the transmitter circuitry through the duplex filter to the antenna, where the FDD receive signals, the TDD transmit signals, and the TDD receive signals share a frequency band of the FDD spectrum.

BRIEF DESCRIPTION OF THE DRAWINGS

FIG. 1 illustrates an example of a frequency division duplex (FDD) paired spectrum, according to certain embodiments.

FIG. 2 illustrates an example of time division duplex (TDD) communication, according to certain embodiments.

FIG. 3 illustrates an example of a re-apportioned FDD TX uplink band of an FDD paired spectrum for TDD application, according to certain embodiments.

FIG. 4 is a schematic diagram of an embodiment of a switching circuit configured to switch the RF transmit signal and the RF receive signal for use in a re-allocated FDD spectrum for TDD application.

FIG. 6A is a schematic diagram of another embodiment of a switching circuit configured to switch the RF transmit signal and the RF receive signal for use in a re-allocated FDD TX uplink band of FDD paired spectrum for TDD application.

FIG. 6B is a schematic diagram of another embodiment of a switching circuit configured to switch the RF transmit signal and the RF receive signal for use in a re-allocated FDD RX downlink band of an FDD paired spectrum for TDD application.

FIG. 7 illustrates an example of a re-apportioned FDD receive downlink band of an FDD paired spectrum for TDD application, according to certain embodiments.

FIG. 8 illustrates an example of a re-apportioned duplex gap band of an FDD paired spectrum for TDD application, according to certain embodiments.

DETAILED DESCRIPTION

Figure 5:
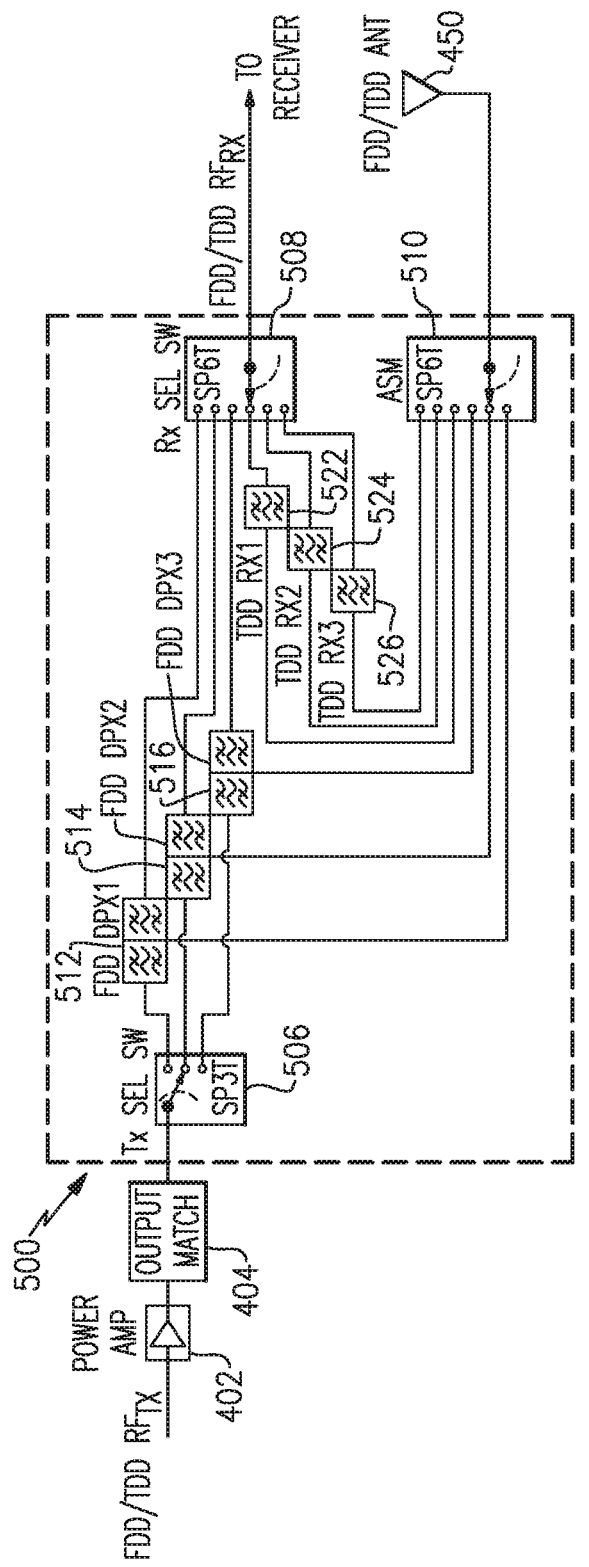
FIG. 5 is a schematic diagram of another embodiment of a switching circuit configured to switch the RF transmit signal and the RF receive signal for use in a re-allocated FDD spectrum for TDD application.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

FIG. 1 illustrates an example of a frequency division duplex (FDD) paired spectrum 100 comprising an FDD transmit (TX) uplink (UL) 102, a duplex band gap 104, and an FDD receive (RX) downlink (DL) 106. FIG. 1 shows transmitting and receiving occurring at approximately the same time, but at different frequencies. Approximately 90% of existing data traffic in modern networks is downlink, which uses the FDD RX DL 106 of the FDD paired spectrum 100. Yet the paired spectrum 100 allocates half the spectrum to uplink (FDD TX UL 102). FDD paired spectrum ties up transmit-only spectrum when it is needed for receive at the user equipment. Evolving use of the FDD TX UL 102 for dual-use as receive downlink will be critical for network capacity and bandwidth efficiency.

An alternative to FDD is Time Division Duplex (TDD). TDD is a method for two-way communication where mobile devices and base station towers at each end of a connection "take turns" transmitting on the same channel. In radio networks like cellular phone networks, for example, devices take turns transmitting on the same radio frequency. FIG. 2 illustrates an example of a TDD spectrum 200, which shows transmitting (TDD TX UL) and receiving (TDD RX DL) occurring at different times using the same or approximately the same frequency.

Embodiments apportion parts of the established FDD transmit spectrum for TDD application, while providing for legacy FDD user equipment (UE) to continue operation while simultaneously supporting TDD transmit and receive use of the transmit band, so that more receive spectrum can be made available.

Advantageously, this enables more receive spectrum to be used that is compatible with existing FDD spectral outlays. Other embodiments make use of accurate scheduling of the TDD operation and intelligent feedback to optimally allocate guard bands when and where needed, depending on the interference environment. Further embodiments use the guard bands for transmitting when needed without coexistence implications.

FIG. 3 illustrates an example of a re-apportioned FDD paired spectrum 300 for TDD application in the transmit band. The FDD spectrum 300 comprises the FDD RX DL 106 and a re-apportioned or re-farmed FDD transmit uplink that supports TDD transmit/receive use of the transmit band, indicated herein as FDD TX UL+TDD TX/RX 302 or band 302. Band 302 comprises one or more FDD TX bands 304, one or more dual-use bands 306, and one or more TDD RX/TDD TX bands 308.

FDD TX bands 304 are used for FDD transmit. For example, legacy user equipment uses the FDD TX bands 304 for continuous FDD transmissions, just as FDD TX band 102 is used for continuous FDD transmissions.

The TDD TX/TDD RX band 308 is used for TDD transmit and receive. The TDD TX/TDD RX band 308 is synchronized to enable sufficient receive performance and to avoid nearby TDD transmissions.

In an embodiment, the TDD TX/TDD RX band 308 can be placed adjacent to the FDD TX spectrum 304 as long as neighboring FDD user equipment does not cause desense or a degradation in sensitivity due to noise sources of the TDD user equipment.

Guard bands may enhance coexistence of the FDD TX spectrum and the TDD RX/TDD TX spectrum within the band 302 where nearby user equipment may be interfering with the receiving. In an embodiment, the dual-use bands 306 comprise guard bands. This can be dynamically allocated for spectral efficiency.

In another embodiment, the dual-use bands 306 may be used for TDD transmitting. In a further embodiment, the dual-use bands 306 may be used for transmitting when TDD transmit is useful or needed, and as guard bands when receive operation required and FDD transmit interference is present. In an embodiment, the interference can be determined by measuring the received signal strength indication (RSSI). In an embodiment, the use of the dual-use bands 306 as either guard bands or TDD transmit is based at least in part on RSSI feedback. In an embodiment, the use of the dual-use bands 306 as either guard bands or TDD transmit bands can be dynamically adjusted if RSSI feedback indicates interference.

Separation between mobile units yields at least −40 dB isolation user equipment to user equipment (UE-to-UE). In an embodiment, emissions should be less than approximately −75 dBm/4.5 MHz from the interfering user equipment antenna to avoid desense in TDD receive channels. Guard bands 306 and PA linearity can be adjusted as needed to achieve sufficient performance.

To utilize the frequency re-allocation described above, the front-end module of a wireless communication device, such as a cell phone and the like, comprises a switching and signal conditioning/filtering circuit to direct the RF transmit signal from the power amplifier through the selected one of the FDD transmit circuitry and the TDD transmit circuitry to an antenna for transmission. The switching and filtering circuit further directs the RF receive signal received by the antenna through the selected one of the FDD receive circuitry and the TDD receive circuitry for baseband processing.

FIG. 4 is a schematic diagram of an embodiment of a switching and filtering circuit 400 configured to switch the RF transmit signal and the RF receive signal for use in a re-allocated FDD spectrum for TDD application.

The RF transmit signal, indicated as FDD/TDD $RF_{TX}$ in FIG. 4, is sent from transmitter circuitry to a power amplifier 402. The power amplifier 402 receives the FDD/TDD RF transmit signal and amplifies the signal for transmission. The FDD/TDD RF transmit signal may be provided for TDD transmission or FDD transmission, depending on the arrangement of the paired spectrum 300. In an embodiment, the FDD/TDD RF transmit signal comprises a high band transmit signal. A matching circuit 404 receives the amplified RF transmit signal from the power amplifier 402 and provides impedance matching for the transmit signal.

The switching circuit 400 receives the impedance matched FDD/TDD RF transmit signal from the matching circuit 404 and routes the FDD/TDD RF transmit signal through the appropriate filter to an FDD/TDD antenna 450 for TDD transmission or FDD transmission, depending on the arrangement of the paired spectrum 300.

Further, the switching circuit 400 receives an RF receive signal, indicated as FDD/TDD $RF_{RX}$, from the FDD/TDD antenna 450 and routes the FDD/TDD RF receive signal through the appropriate filter to receiver circuitry for subsequent downconversion and baseband processing. The FDD/TDD RF receive signal may be received as an FDD signal or a TDD signal, depending on the arrangement of the paired spectrum 300.

The switching circuit 400 comprises a first or TX select switch 406, a second or RX select switch or 408, a third switch or antenna switching module 410, a plurality of FDD duplex filters 412, 414, 416, a plurality of TDD receive filters 422, 424, 426, and a plurality of TDD transmit filters 432, 434, 436.

The FDD duplex filters 412, 414, 416, for example, can be configured to filter transmit and receive FDD RF signals in radio devices, where the transmission and the reception are made at different frequencies via the same antenna. Typically, a duplex filter is a three-port circuit element comprising transmitter port, a receiver port, and an antenna port. An RF signal supplied to the transmitter port at the transmit frequency sees the signal path towards the receiver port as a high impedance, so that the radio power is not substantially directed to the receiver port, but it is directed through the antenna port to the antenna, where it is radiated as a RF signal to the environment. Correspondingly, an RF signal received through the antenna and the antenna port at the receive frequency sees the transmitter port as a high impedance, so that it is directed to the receiver port and further to the receiver sections of the radio device. The function of the duplex filter is generally based on different frequency response characteristics of the filter components. In an embodiment, the FDD duplex filters 412, 414, 416 each further comprise a transmit filter and a receive filter. In an embodiment, the transmit filters and the receive filters comprise bandpass filters. Further combinations of these TX and RX bands can be logically extended to gang multiple TX and RX filters together toward a single antenna port as well.

The TDD receive filters 422, 424, 426 are configured to filter TDD RF receive signals from the FDD/TDD antenna 450. The outputs of the TDD receive filters 422, 424, 426 are routed to receiver portions of the radio device for further processing. In an embodiment, the TDD receive filters 422, 424, 426 comprise bandpass filters. These filters may also be similarly ganged together to share a common connection, but still signal condition a dedicated RX path on the way to the transceiver and radio downconversion and baseband processing.

The TDD transmit filters 432, 434, 436 are configured to filter TDD RF transmit signals from the matching circuit 404. The outputs of the TDD RF transmit filters 432, 434, 436 are routed to the FDD/TDD antenna 450 for transmission. In an embodiment, the TDD transmit filters 432, 434, 436 comprise bandpass filters. These filters may also be similarly ganged together to share a common connection, but still signal condition a dedicated TX path on the way to the antenna.

In the example illustrated in FIG. 4, the plurality of FDD duplex filters comprises three filters, the plurality of TDD receive filters comprises three filters, and the plurality of TDD transmit filters comprises three filters. In other embodiments, there may be more or less than three FDD duplex filters, more or less than three TDD receive filters, and more or less than three TDD transmit filters, and combined in various ways depending on the frequency band allocation for FDD signals and the time slot allocation for TDD signals in the paired spectrum 300.

In the embodiment illustrated in FIG. 4, the first switch 406 comprises a single pole 6 throw (SP6T) switch where three of the throws electrically connect to a transmitter port of a corresponding one of the FDD duplex filters 412, 414, 416, three of the throws electrically connect to an input of a corresponding TDD transmit filter 432, 434, 436, and the pole electrically connects to the output of the matching circuit 404. The position of the first switch 406 is controlled by at least one signal from a baseband subsystem that includes a processor and is based at least in part on the arrangement of the paired spectrum 300.

The first switch 406 receives the output of the matching circuit 404 and routes the FDD/TDD RF transmit signal to the appropriate transmit filter. When the FDD/TDD RF transmit signal comprises an FDD RF transmit signal, the first switch 406 routes the FDD RF transmit signal to the transmitter port of the selected one of the FDD duplex filters 412, 414, 416 where the transmit filter of the selected one of the FDD duplex filters 412, 414, 416 filters the FDD RF transmit signal.

When the FDD/TDD RF transmit signal comprises a TDD RF transmit signal, the first switch 406 routes the TDD RF transmit signal to the input of a selected one of the TDD transmit filters 432, 434, 436 where the selected one of the TDD transmit filters 432, 434, 436 filters the TDD RF transmit signal. As indicated above, the position of the first switch 406 is controlled by the at least one signal from the baseband subsystem. Thus, at least one signal from the baseband subsystem controls the selection of the TDD transmit filters 432, 434, 436 and the selection is based at least in part on the arrangement of the paired spectrum 300.

The third switch 410 routes the FDD/TDD RF transmit signal from the selected filter 412, 414, 416 432, 434, 436 to the FDD/TDD antenna 450 for transmission. In the embodiment illustrated in FIG. 4, the third switch 410 comprises a single pole 9 throw (SP9T) switch where three of the throws electrically connect to an output of a corresponding TDD transmit filter 432, 434, 436, three of the throws electrically connect to a corresponding antenna port of the FDD duplex filters 412, 414, 416, three of the throws electrically connect to an input of a corresponding TDD receive filter 422, 424, 426, and the pole electrically connects to antenna circuitry including the FDD/TDD antenna 450. The position of the third switch 410 is controlled by at least one signal from the baseband subsystem that includes the processor and is based at least in part on the arrangement of the paired spectrum 300. When the switching circuit 400 is configured to transmit, the third switch 410 is configured to electrically connect a selected one of the outputs of the filters 412, 414, 416, 432, 434, 436 to the FDD/TDD antenna 450.

As described above, the FDD/TDD antenna 450 is also configured to receive RF signals. When the switching circuit 400 is configured to receive, the FDD/TDD antenna 450 receives the FDD/TDD RF receive signal. The third switch 410 routes the FDD/TDD RF receive signal to the appropriate receive filter. For example, when the FDD/TDD RF receive signal comprises an FDD RF receive signal, the third switch 410 routes the FDD RF receive signal to the antenna port of the selected one of the FDD duplex filters 412, 414, 416 for filtering.

When the FDD/TDD RF receive signal comprises a TDD RF receive signal, the third switch 410 routes the TDD RF receive signal to an input of a selected one of the TDD receive filters 422, 424, 426 for filtering. Again, the at least one signal from the baseband subsystem controls the selection of the filters 412, 414, 416, 422, 424, 426 and the selection is based at least in part on the arrangement of the paired spectrum 300.

The outputs of the TDD receive filters 422, 424, 426 and the receiver ports of the FDD duplex filters 412, 414, 416 electrically connect to a corresponding one of the throws of the second switch 408. The second switch 408 routes the FDD/TDD RF receive signal to the receiver portion of the radio frequency device for further processing.

In the embodiment illustrated in FIG. 4, the second switch 410 comprises a single pole 6 throw (SP6T) switch where three of the throws electrically connect to an output of a corresponding TDD receive filter 422, 424, 426, three of the throws electrically connect to a corresponding receiver port of the FDD duplex filters 412, 414, 416, and the pole electrically connects to the receiver portion of the radio frequency device. The position of the second switch 408 is controlled by at least one signal from the baseband subsystem that includes the processor. When the switching circuit 400 is configured to receive, the second switch 408 electrically connects a selected one of the outputs of the TDD receive filters 422, 424, 426 or antenna ports of the FDD duplex filters 412, 414, 416 to the receiver portion of the radio frequency device. Again, the at least one signal from the baseband subsystem controls the selection of the filters 412, 414, 416, 422, 424, 426 and the selection is based at least in part on the arrangement of the paired spectrum 300.

FIG. 5 is a schematic diagram of another embodiment of a switching circuit 500 configured to implement both TDD and FDD in a shared band. The switching circuit 500 re-uses the transmit filters of the FDD duplex filters to filter both FDD RF transmit signals and TDD RF transmit signals.

As described above with respect to FIG. 4, the switching circuit 500 receives the impedance matched FDD/TDD RF transmit signal from the matching circuit 404. The FDD/TDD RF transmit signal may be received as an FDD signal or a TDD signal, depending on the arrangement of the paired spectrum 300. The switch 500 routes the FDD/TDD RF transmit signal through the appropriate filter to the FDD/TDD antenna 450 for TDD transmission or FDD transmission, depending on the arrangement of the paired spectrum 300.

Further, the switching circuit 500 receives the FDD/TDD RF receive signal from the FDD/TDD antenna 450 and routes the FDD/TDD RF receive signal through the appropriate filter to the receiver portion of the radio frequency device for subsequent baseband processing. The FDD/TDD RF receive signal may be received as an FDD signal or a TDD signal, depending on the arrangement of the paired spectrum 300.

The switching circuit 500 comprises a first or TX select switch 506, a second or RX select switch or 508, a third switch or antenna switching module 510, a plurality of FDD duplex filters 512, 514, 516, and a plurality of TDD receive filters 522, 524, 526. The FDD duplex filters 512, 514, 516 are configured to filter FDD RF transmit signals and TDD RF transmit signals from the matching circuit 404 and FDD RF receive signals from the FDD/TDD antenna 450. In an embodiment, the transmit and receive filters of the FDD duplex filters 512, 514, 516 comprise bandpass filters. The TDD receive filters 522, 524, 526 are configured to filter TDD RF receive signals from the FDD/TDD antenna 450. In an embodiment, the TDD receive filters 522, 524, 526 comprise bandpass filters.

In the example illustrated in FIG. 5, the plurality of FDD duplex filters comprises three filters, and the plurality of TDD receive filters comprises three filters. In other embodiments, there may be more or less than three FDD duplex filters, and more or less than three TDD receive filters, depending on the frequency band allocation for FDD signals and the time slot allocation for TDD signals.

The first switch 506 receives the output of the matching circuit 404 and routes the FDD/TDD RF transmit signal to the transmitter port of the selected FDD duplex filter 512, 514, 516. In an embodiment, the TDD RF transmit signals and the FDD RF transmit signals use the same or approximately the same frequency bands such that the FDD duplex filters 512, 514, 516 are configured to filter both the FDD RF transmit signal and the TDD RF transmit signal.

In the embodiment illustrated in FIG. 5, the first switch 506 comprises a single pole 3 throw (SP3T) switch where the throws are electrically connected to the transmitter port of a corresponding one of the FDD duplex filters 512, 514, 516 and the pole electrically connects to the output of the matching circuit 404. The position of the first switch 506 is controlled by at least one signal from the baseband subsystem and is based at least in part on the arrangement of the paired spectrum 300.

The antenna ports of the FDD duplex filters 512, 514, 516 electrically connect to a corresponding one of the throws of the third switch 510. The third switch 510 routes the FDD/TDD RF transmit signal to the FDD/TDD antenna 450 for transmission.

In the embodiment illustrated in FIG. 5, the third switch 510 comprises a single pole 6 throw (SP6T) switch where three of the throws electrically connect to a corresponding antenna port of the FDD duplex filters 512, 514, 516, three of the throws electrically connect to an input of a corresponding TDD receive filter 522, 524, 526, and the pole electrically connects to antenna circuitry including the FDD/TDD antenna 450. The position of the third switch 510 is controlled by at least one signal from the baseband subsystem that includes the processor. When the switching circuit 500 is configured to transmit, the third switch 510 is configured to electrically connect a selected one of the antenna ports of the FDD duplex filters 512, 514, 516 to the FDD/TDD antenna 450. Again, the at least one signal from the baseband subsystem controls the selection of the FDD duplex filters 512, 514, 516 and the selection is based at least in part on the arrangement of the paired spectrum 300.

When the switching circuit 500 is configured to receive, the FDD/TDD antenna 450 receives the FDD/TDD RF receive signal. The third switch 510 routes the FDD/TDD RF receive signal to the appropriate receive filter. For example when the FDD/TDD RF receive signal comprises an FDD RF receive signal, the third switch 510 routes the FDD RF receive signal to the antenna port of the selected one of the FDD duplex filters 512, 514, 516 for filtering. When the FDD/TDD RF receive signal comprises a TDD RF receive signal, the third switch 510 routes the TDD RF receive signal to a selected one of the TDD receive filters 522, 524, 526 for filtering.

The outputs of the TDD receive filters 522, 524, 526 and the receiver ports of the FDD duplex filters 512, 514, 516 electrically connect to a corresponding one of the throws of the second switch 508. The second switch 508 routes the FDD/TDD RF receive signal to the receiver portion of the radio frequency device for further processing.

In the embodiment illustrated in FIG. 5, the second switch 510 comprises a single pole 6 throw (SP6T) switch where three of the throws are electrically connected to an output of a corresponding TDD receive filter 522, 524, 526, three of the throws electrically connect to a corresponding receiver port of the FDD duplex filters 512, 514, 516 and the pole electrically connects to the receiver portion. The position of the second switch 508 is controlled by at least one signal from the baseband subsystem that includes the processor and is based at least in part on the arrangement of the paired spectrum 300. When the switching circuit 500 is receiving, the second switch 508 electrically connects a selected one of the outputs of the filters 512, 514, 516, 522, 524, 526 to the receiver portion of the radio frequency device.

FIG. 6A is a schematic diagram of another embodiment of a switching circuit 600A configured to implement both TDD and FDD in a shared band. The switching circuit 600A re-uses the transmit filters of the FDD duplex filters to filter both FDD transmit RF signals and TDD RF transmit signals, and re-uses the receive filters of the FDD duplex filters to filter both FDD receive signals and TDD RF receive signals.

As described above with respect to FIG. 4, the switching circuit 600A receives the impedance matched FDD/TDD RF transmit signal from the matching circuit 404. The switching circuit 600A routes the FDD/TDD RF transmit signal through the appropriate filter to the FDD/TDD antenna 450 for TDD transmission or FDD transmission, depending on the arrangement of the paired spectrum 300. Further, the switching circuit 600A receives the RF receive signal from the FDD/TDD antenna 450 and routes the FDD/TDD RF receive signal through the appropriate filter to the receive portion of the radio frequency device for subsequent baseband processing. The FDD/TDD RF receive signal may be received as an FDD signal or a TDD signal, depending on the arrangement of the paired spectrum 300.

The switching circuit 600A comprises a first or TX/RX select switch 606A, a second or RX select switch or 608A, a third switch or antenna switching module 610A, and a plurality of FDD duplex filters 612A, 614A, 616A. The FDD duplex filters 612A, 614A, 616A are configured to filter TDD RF transmit signals and FDD RF transmit signals from the matching circuit 404. The FDD duplex filters 612A, 614A, 616A are further configured to filter TDD RF receive signals and FDD RF receive signals from the FDD/TDD antenna 450. In an embodiment, the transmit filters and the receive filters of the FDD duplex filters 612A, 614A, 616A comprise bandpass filters.

In the example illustrated in FIG. 6A, the plurality of FDD duplex filters comprises three filters. In other embodiments, there may be more or less than three FDD duplex filters, depending on the frequency band allocation for FDD signals and the time slot allocation for TDD signals.

In the embodiment illustrated in FIG. 6A, the first switch 606A comprises a double pole 3 throw (DP3T) switch where the throws electrically connect to the transmitter port of a corresponding one of the FDD duplex filters 612A, 614A, 616A. A first pole of the first switch 606A electrically connects to the output of the matching circuit 404 and a second pole of the first switch 606A electrically connects to the second switch 608A.

When the switching circuit 600A is configured to transmit, the first switch 606A electrically connects the output of the matching circuit 404 to the transmitter port of a selected one of the FDD duplex filters 612A, 614A, 616A. In an embodiment, the TDD RF transmit signals and the FDD RF transmit signals use the same or approximately the same frequency bands such that the FDD duplex filters 612A, 614A, 616A are configured to filter both the FDD RF transmit signal and the TDD RF transmit signal.

The position of the first switch 606A is controlled by at least one signal from the baseband subsystem and is based at least in part on the arrangement of the paired spectrum 300.

The antenna ports of the FDD duplex filters 612A, 614A, 616A electrically connect to a corresponding one of the throws of the third switch 610A. The third switch 610A routes the FDD/TDD RF transmit signal to the FDD/TDD antenna 450 for transmission.

In the embodiment illustrated in FIG. 6A, the third switch 610A comprises a single pole 3 throw (SP3T) switch where the three throws electrically connect to the antenna port of a corresponding FDD duplex filter 612A, 614A, 616A and the pole electrically connects to antenna circuitry including the FDD/TDD antenna 450. The position of the third switch 610A is controlled by at least one signal from the baseband subsystem that includes the processor and is based at least in part on the arrangement of the paired spectrum 300. When the switching circuit 600A configured to transmit, the third switch 610A electrically connects a selected one of the antenna ports of the FDD duplex filters 612A, 614A, 616A to the FDD/TDD antenna 450.

When the switching circuit 600A is configured to receive, the FDD/TDD antenna 450 receives the FDD/TDD RF receive signal. The third switch 610A routes the FDD/TDD RF receive signal to the antenna port of the selected one of the FDD duplex filter 612A, 614A, 616A where the FDD/TDD RF receive signal is filtered. When the FDD/TDD RF receive signal comprises an FDD/TDD RF receive signal, the receive filter of the selected one of the FDD duplex filter 612A, 614A, 616A filters the FDD/TDD RF receive signal and the selected one of the FDD duplex filters 612A, 614A, 616A outputs the filtered FDD/TDD RF receive signal through its receiver port.

The receiver ports of the FDD duplex filters 612A, 614A, 616A electrically connect to a corresponding one of the throws of the second switch 608A. The second switch 608A routes the FDD RF receive signal to the receiver portion of the radio frequency device for further processing.

In the embodiment illustrated in FIG. 6A, the capability is further enhanced to enable the reception of signals within the transmit band of the duplex filters. The second switch 608A comprises a single pole 4 throw (SP4T) switch where three of the throws electrically connect to a corresponding receiver port of the FDD duplex filters 612A, 614A, 616A, and additionally the fourth throw electrically connects to the second pole of the first switch 606A, and the pole electrically connects to the receiver portion. The position of the second switch 608A is controlled by at least one signal from the baseband subsystem that includes the processor and is based at least in part on the arrangement of the paired spectrum 300. When the switching circuit 600A is configured to receive FDD RF receive signals, the second switch 608A electrically connects the receiver port of a selected one of the FDD duplex filters 612A, 614A, 616A to the receive portion of the radio frequency device.

When the FDD/TDD RF receive signal comprises a desired TDD RF receive signal that exists within the transmit band of one of the FDD duplex filters 612A, 614A, 616A, the transmit filter of the selected one of the FDD duplex filter 612A, 614A, 616A filters the TDD RF receive signal and the selected one of the FDD duplex filters 612A, 614A, 616A outputs the filtered TDD RF receive signal through its transmitter port. In an embodiment, the TDD RF receive signals and the FDD RF transmit signals use the same or approximately the same frequency bands such that the FDD duplex filters 612A, 614A, 616A are configured to filter both the FDD RF transmit signal and the TDD RF receive signal.

Further, when the FDD/TDD RF receive signal comprises a TDD RF receive signal, the at least one control signal controls the first switch 606A to electrically connect the second pole of the first switch to the transmitter port of the selected one of the FDD duplex filters 612A, 614A, 616A.

As described above, the second pole of the first switch 606A also electrically connects to the fourth throw of the second switch 608A. Thus, when the FDD/TDD RF receive signal comprises a TDD RF receive signal, the first switch 606A, the second switch 608A, and the third switch 610A are configured such that the TDD RF receive signal is routed to the antenna port of the selected one of the FDD duplex filters 612A, 614A, 616A, and filtered. The filtered TDD RF receive signal is output through the transmitter port of the selected one of the FDD duplex filters 612A, 614A, 616A through the second pole of the first switch 606A and the fourth throw of the second switch 608A to the receive portion of the radio frequency device for further processing.

FIG. 7 illustrates an example of a re-apportioned FDD RX DL band 702 for TDD application of an FDD paired spectrum 700. The FDD spectrum 700 comprises the FDD TX UL+TDD TX/RX band 302 or band 302 and the re-apportioned or re-farmed FDD receive downlink that supports TDD transmit/receive use of the FDD receive band, indicated herein as FDD RX DL+TDD TX/RX 706 or band 706. Band 706 comprises one or more FDD RX bands 714, one or more dual-use bands 716, and one or more TDD RX/TDD TX bands 718.

The FDD RX bands 714 are used for FDD receive. For example, legacy user equipment uses the FDD RX bands 714 for continuous FDD receiving, just as FDD RX band 106 is used for continuous FDD receiving.

The TDD TX/RX band 718 is used for TDD transmit and receive. The TDD TX/RX band 718 is synchronized to enable sufficient receive performance and to avoid nearby TDD transmitting.

In an embodiment, the TDD TX/RX band 718 can be placed adjacent to the FDD RX spectrum 714 as long as neighboring FDD user equipment does not cause desense or a degradation in sensitivity due to noise sources of the TDD user equipment.

Guard bands may enhance coexistence of the FDD RX spectrum and the TDD RX/TDD TX spectrum within the band 706 where nearby user equipment may be interfering with the receiving. In an embodiment, the dual-use bands 716 comprise guard bands. This can be dynamically allocated for spectral efficiency.

In another embodiment, the dual-use bands 716 may be used for TDD receiving. In a further embodiment, the dual-use bands 716 may be used for reception when TDD receive is useful or needed, and simply as guard bands when receive operation is required and FDD receive interference is present. In an embodiment, the interference can be determined by measuring the received signal strength indication (RSSI). In an embodiment, the use of the dual-use bands 716 as either guard bands or TDD transmit is based at least in part on RSSI feedback. In an embodiment, the use of the dual-use bands 716 as either guard bands or TDD receive bands can be dynamically adjusted if RSSI feedback indicates interference. Guard bands 716 and PA linearity can be adjusted as needed to achieve sufficient performance.

In another embodiment, the FDD spectrum 700 comprises the FDD TX UL 102 and the FDD RX DL+TDD TX/RX 706 or band 706, as described above.

FIG. 6B is a schematic diagram of another embodiment of a switching circuit 600B configured to implement both TDD and FDD in a shared band. The switching circuit 600B re-uses the receive filters of the FDD duplex filters to filter both FDD receive RF signals and TDD RF receive signals, and re-uses the receive filters of the FDD duplex filters to filter the FDD receive signals, TDD RF receive signals, and TDD transmit signals.

In the embodiment illustrated in FIG. 6B, the first switch 606B comprises a double pole 3 throw (DP3T) switch where the poles can be electrically connected together and route the transmit signal to the second switch 608B.

When the FDD/TDD RF transmit signal comprises a desired TDD RF transmit signal that exists within the receive band of one of the FDD duplex filters 612B, 614B, 616B, the receive filter of the selected one of the FDD duplex filter 612B, 614B, 616B filters the TDD RF transmit signal and the selected one of the FDD duplex filters 612B, 614B, 616B outputs the filtered TDD RF transmit signal through its antenna port. In an embodiment, the TDD RF transmit signals and the FDD RF receive signals use the same or approximately the same frequency bands such that the FDD duplex filters 612B, 614B, 616B are configured to filter both the FDD RF receive signal, the TDD RF receive signal, and the TDD RF transmit signal.

Further, when the FDD/TDD RF transmit signal comprises a TDD RF transmit signal within one of the duplexer receive bands, the at least one control signal controls the first switch 606B to electrically connect the second pole of the first switch to the first pole of the first switch, and route the TDD transmit signal to the second pole of the second switch 608B. The second switch 608B is configured to connect its second pole to the desired receive filter of the appropriate duplexer 612B, 614B, 616B, and then onto through to the antenna 450A. In this way the transmit signal path is enabled to re-use the receive portion of the available duplexers.

FIG. 8 illustrates an example of a re-apportioned duplex gap band 804 for TDD application of an FDD paired spectrum 800. In an embodiment, the paired spectrum 800 comprises the FDD TX UL+TDD TX/RX band 302, the FDD RX UL band 106, and the re-apportioned duplex gap band 804. In an embodiment, the gap band 804 comprises one or more dual use bands 816, 820 and one or more TDD RX/TDD TX bands 818. The TDD RX/TDD TX band 818 is used for TDD transmit and receive and is synchronized to enable sufficient receive performance and to avoid nearby TDD transmit.

Guard bands may enhance coexistence of the FDD paired spectrum 800 and the TDD RX/TDD TX band 818 within the gap band 804. In an embodiment, the dual-use bands 816, 820 comprise guard bands. This can be dynamically allocated for spectral efficiency.

In another embodiment, the dual-use band 816 may be used for TDD transmit. In a further embodiment, the dual-use band 816 may be used for transmit when TDD transmit is useful or needed, and simply as a guard band when interference is present. In an embodiment, the interference can be determined by measuring the received signal strength indication (RSSI). In an embodiment, the use of the dual-use band 816 as either the guard bands or TDD transmit is based at least in part on RSSI feedback. In an embodiment, the use of the dual-use band 816 as either the guard band or a TDD transmit band can be dynamically adjusted if RSSI feedback indicates interference. Guard band 816 and PA linearity can be adjusted as needed to achieve sufficient performance.

In another embodiment, the dual-use band 820 may be used for TDD reception. In a further embodiment, the dual-use band 820 may be used for reception when TDD receive is useful or needed, and simply as guard bands interference is present. In an embodiment, the interference can be determined by measuring the received signal strength indication (RSSI). In an embodiment, the use of the dual-use band 820 as either a guard band or a TDD receive is based at least in part on RSSI feedback. In an embodiment, the use of the dual-use band 820 as either a guard band or a TDD receive band can be dynamically adjusted if RSSI feedback indicates interference. Guard band 820 and PA linearity can be adjusted as needed to achieve sufficient performance.

In another embodiment, the FDD spectrum 800 comprises the gap band 804, one of the FDD TX UL band 102 and the FDD TX UL+TDD TX/RX band 302, and one of the FDD RX DL band 106 and the FDD RX DL+TDD TX/RX band 706.

Figure 6C:
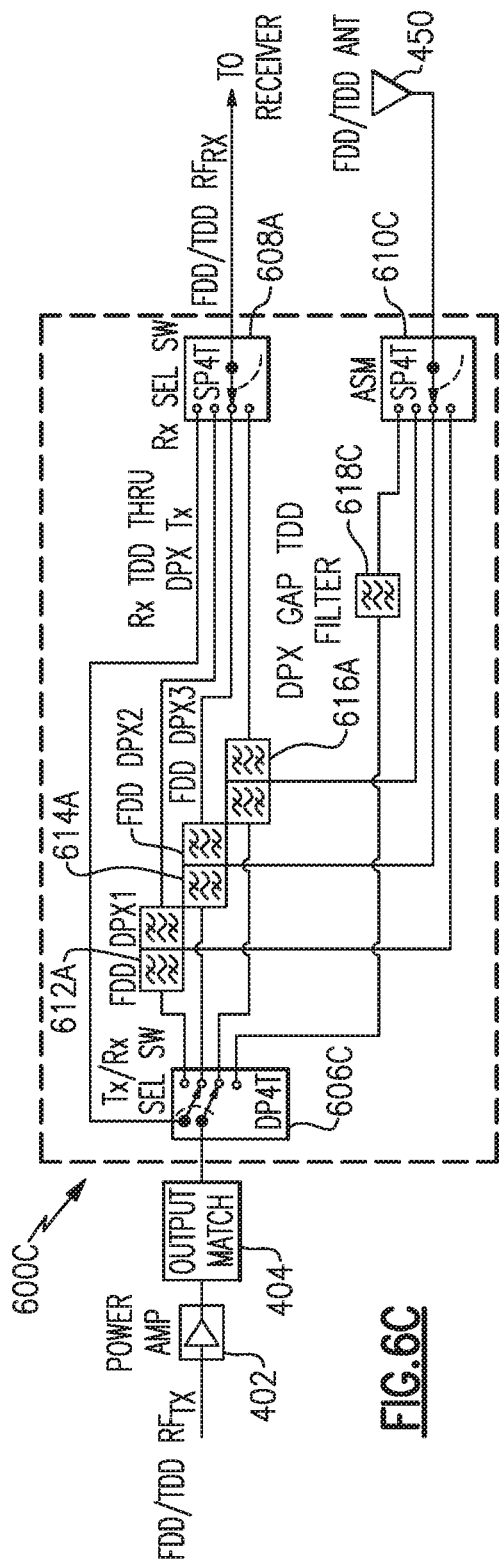
FIG. 6C is a schematic diagram of another embodiment of a switching circuit configured to switch the RF transmit signal and the RF receive signal for use in a re-allocated FDD TX uplink band and a re-apportioned duplex gap band of an FDD paired spectrum for TDD application.

FIG. 6C is a schematic diagram of another embodiment of a switching circuit 600C configured to implement both TDD and FDD in a shared band. The switching circuit 600C is configured to switch the RF transmit signal and the RF receive signal for use in a re-allocated FDD TX uplink band 302 as described above with respect to FIG. 6A. The switching circuit 600C is further configured to switch the TDD transmit signal and the TDD receive signal for a re-apportioned duplex gap band 804 of an FDD paired spectrum for TDD application, where, in an embodiment, no FDD filtering exists.

In an embodiment, the switching circuit 600C comprises the switching circuit 600A including the FDD duplexer filters 612A, 614A, 616A and the RX select switch 608A with an additional signal path between the TX/RX select switch 606A and the antenna switching module 610A comprising a TDD duplex gap filter 618C. The TDD duplex gap filter 618C filters the TDD transmit and TDD receive signals in the re-apportioned duplex gap band 804.

To accommodate the additional switching path a first or TX/RX select switch 606C comprises a double pole 4 throw (DP4T) switch where the DP3T portion of the TX/RX select switch 606C operates as the TX/RX select switch 606A and is described above with respect to FIG. 6A. The fourth throw of the TX/RX select switch 606C electrically connects to a first port of the TDD duplex gap filter 618D.

To further accommodate the additional switching path a third switch or antenna switching module 610C comprises a single pole 4 throw (SP4T) switch where the SP3T portion of the antenna switching module 610C operates as the antenna switching module 610A and is described above with respect to FIG. 6A. The fourth throw of the antenna-switching module 610C electrically connects to a second port of the TDD duplex gap filter 618C.

The positions of the switches 606C, 608A, and 610C are controlled by at least one signal from the baseband subsystem that includes the processor and is based at least in part on the arrangement of the paired spectrum 300, 800.

When the switching circuit 600C is configured to transmit TDD signals in the re-allocated duplex gap 804, the TX/RX select switch 606C electrically connects the output of the matching circuit 604 to the first port of the duplex gap TDD filter 618C. The duplex gap TDD filter 618C filters the TDD transmit signal. In an embodiment, the duplex gap TDD filter 618C comprises a bandpass filter. The antenna-switching module 610C receives the filtered TDD signal and electrically connects to antenna circuitry including the FDD/TDD antenna 450.

When the switching circuit 600C is configured to receive TDD signals in the re-allocated duplex gap 804, the antenna switching module 610C electrically connects the TDD receive signal to the second port of the duplex gap TDD filter 618C, where the duplex gap TDD filter 618C filters the TDD receive signal. The TX/RX select switch 606C receives the filtered TDD receive signal and electrically connects through the second pole the TX/RX select switch 606C to the RX select switch 608A. The RX select switch 608A routes the TDD RF receive signal to the receiver portion of the radio frequency device for further processing.

Figure 6D:
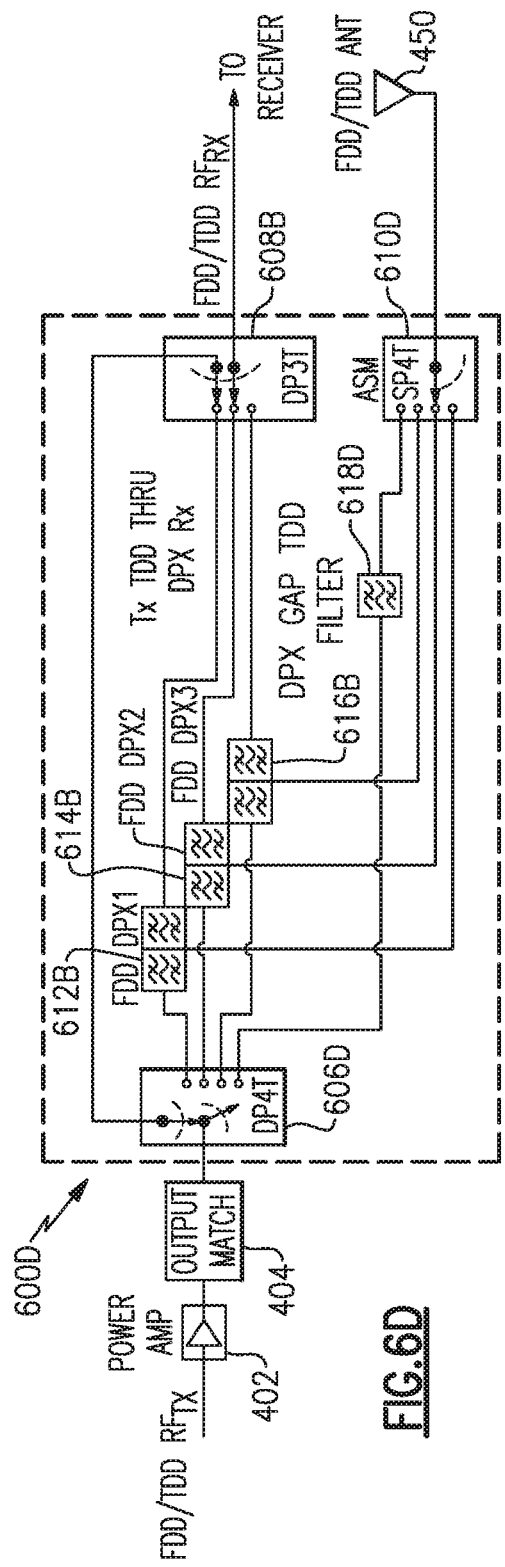
FIG. 6D is a schematic diagram of another embodiment of a switching circuit configured to switch the RF transmit signal and the RF receive signal for use in a re-allocated FDD RX downlink band and a re-apportioned duplex gap band of an FDD paired spectrum for TDD application.

FIG. 6D is a schematic diagram of another embodiment of a switching circuit 600D configured to implement both TDD and FDD in a shared band. The switching circuit 600D is configured to switch the RF transmit signal and the RF receive signal for use in a re-allocated FDD RX downlink band 706 as described above with respect to FIG. 6B. The switching circuit 600D is further configured to switch the TDD transmit signal and the TDD receive signal for a re-apportioned duplex gap band 804 of an FDD paired spectrum for TDD application, where, in an embodiment, no FDD filtering exists.

In an embodiment, the switching circuit 600D comprises the switching circuit 600B including the FDD duplexer filters 612B, 614B, 616B and the RX select switch 608B with an additional signal path between the TX/RX select switch 606B and the antenna switching module 610B comprising a TDD duplex gap filter 618D. The TDD duplex gap filter 618D filters the TDD transmit and TDD receive signals in the re-apportioned duplex gap band 804.

To accommodate the additional switching path a first or TX/RX select switch 606D comprises a double pole 4 throw (DP4T) switch where the DP3T portion of the TX/RX select switch 606D operates as the TX/RX select switch 606B and is described above with respect to FIG. 6B. The fourth throw of the TX/RX select switch 606D electrically connects to a first port of the TDD duplex gap filter 618D. To further accommodate the additional switching path a third switch or antenna switching module 610D comprises a single pole 4 throw (SP4T) switch where the SP3T portion of the antenna switching module 610D operates as the antenna switching module 610B and is described above with respect to FIG. 6B. The fourth throw of the antenna-switching module 610D electrically connects to a second port of the TDD duplex gap filter 618D.

The positions of the switches 606D, 608B, and 610D are controlled by at least one signal from the baseband subsystem that includes the processor and is based at least in part on the arrangement of the paired spectrum 700, 800.

When the switching circuit 600D is configured to transmit TDD signals in the re-allocated duplex gap 804, the TX/RX select switch 606D electrically connects the output of the matching circuit 604 to the first port of the duplex gap TDD filter 618D. The duplex gap TDD filter 618D filters the TDD transmit signal. In an embodiment, the duplex gap TDD filter 618D comprises a bandpass filter. The antenna-switching module 610D receives the filtered TDD signal and electrically connects to antenna circuitry including the FDD/TDD antenna 450.

When the switching circuit 600D is configured to receive TDD signals in the re-allocated duplex gap 804, the antenna switching module 610D electrically connects the TDD receive signal to the second port of the duplex gap TDD filter 618D, where the duplex gap TDD filter 618D filters the TDD receive signal. The TX/RX select switch 606D receives the filtered TDD receive signal and electrically connects through the second pole the TX/RX select switch 606D to the RX select switch 608B. The RX select switch 608B routes the TDD RF receive signal to the receiver portion of the radio frequency device for further processing.

In another embodiment, the additional signal path comprising the TDD duplex gap filter 618D for the switching circuit 600D is between the TX/RX select switch 606D and the RX select switch 608B.

In an embodiment, the various filter segments 612A, 614A, 616A, 618C/612B, 614B, 616B, 618D overlap by at least a minimum channel bandwidth, such that a 15 MHz channel, for example, can be transmitted anywhere on a 100 kHz grid within the band of interest.

The switching circuits 400, 500, 600 are described as examples of switching circuits to implement a shared FDD and TDD spectrum. In other embodiments, the switches 406, 408, 410, 506, 508, 510, 606, 608, 610 may have more or less poles and throws, depending on the arrangement of the spectrum 300, 700, 800.

Figure 9A:
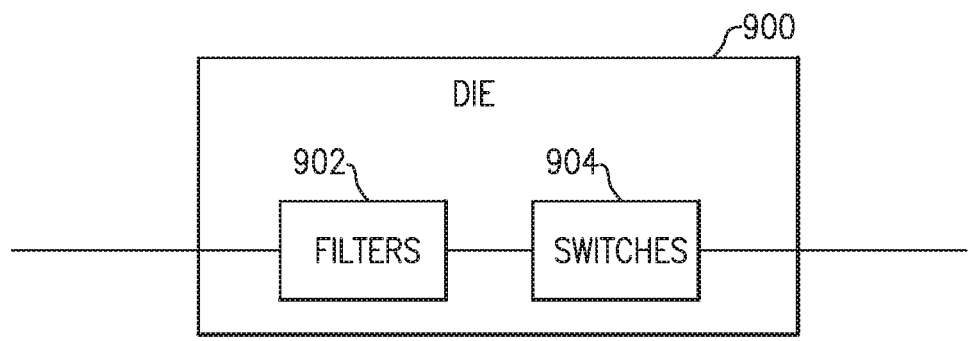
FIG. 9A is an exemplary block diagram of a multimode semiconductor die including an embodiment of a switching circuit to implement an FDD and TDD shared band, according to certain embodiments.

FIG. 9A is an exemplary block diagram of a multimode semiconductor die 900 including the switching and signal filtering circuit 400, 500, 600A or 600B that includes a filtering circuit 902 and a switching circuit 904. In one embodiment, the multimode semiconductor die 900 comprises the switching and signal filtering circuit 400; the filtering circuit 902 comprises the filters 412, 414, 416, 422, 424, 426, 432, 434, 436; and the switching circuit 904 comprises the switches 406, 408, and 410. In another embodiment, multimode semiconductor die 900 comprises the switching and signal filtering circuit 500; the filtering circuit 902 comprises the filters 512, 514, 516, 522, 524, 526; and the switching circuit 904 comprises the switches 506, 508, 510. In a further embodiment, the multimode semiconductor die 900 comprises the switching and signal filtering circuit 600A; the filtering circuit 902 comprises the filters 612A, 614A, 616A; and the switching circuit 904 comprises the switches 606A, 608A, 610A. In a further embodiment, the multimode semiconductor die 900 comprises the switching and signal filtering circuit 600B; the filtering circuit 902 comprises the filters 612B, 614B, 616B; and the switching circuit 904 comprises the switches 606B, 608B, 610B.

Figure 9B:
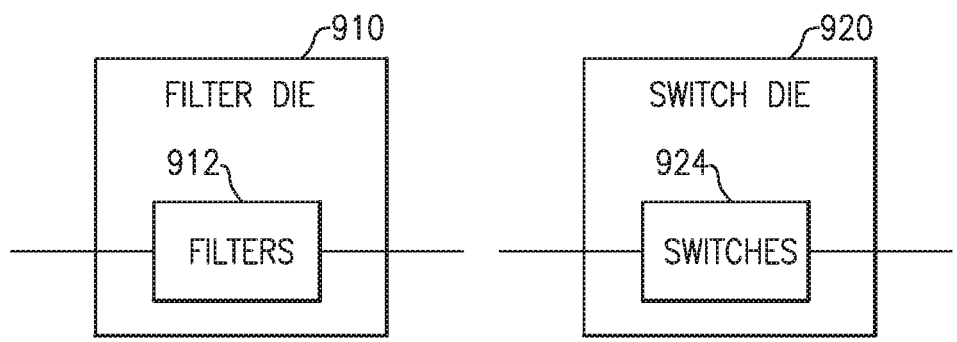
FIG. 9B is an exemplary block diagram of a switching circuit set of having a first semiconductor die including an embodiment of filter circuits and a second semiconductor die including an embodiment of a switching circuit, according to certain embodiments.

FIG. 9B is an exemplary block diagram of a set of semiconductor die comprising a first semiconductor die 910 including a filtering circuit 912 and a second semiconductor die 920 including a switching circuit 924. In an embodiment, the die set comprises the switching and signal filtering circuit 400; the filtering circuit 912 comprises the filters 412, 414, 416, 422, 424, 426, 432, 434, 436; and the switching circuit 924 comprises the switches 406, 408, and 410. In another embodiment, the die set comprises the switching and signal filtering circuit 500; the filtering circuit 912 comprises the filters 512, 514, 516, 522, 524, 526; and the switching circuit 924 comprises the switches 506, 508, 510. In a further embodiment, the die set comprises the switching and signal filtering circuit 600A; the filtering circuit 912 comprises the filters 612A, 614A, 616A; and the switching circuit 924 comprises the switches 606A, 608A, 610A. In a further embodiment, the die set comprises the switching and signal filtering circuit 600B; the filtering circuit 912 comprises the filters 612B, 614B, 616B; and the switching circuit 924 comprises the switches 606B, 608B, 610B.

In an embodiment, the semiconductor die 900, 910, 920 comprises a silicon (Si) die and assorted filters. In an embodiment, the semiconductor die 900 comprises a silicon-on-Insulator (SOI) die and assorted filters. In another embodiment, the die 900, 910, 920 can comprise a gallium arsenide (GaAs) die, a pseudomorphic high electron mobility transistor (pHEMT) die, or the like. In another embodiment, the filter content can comprise any variety of acoustic filter technologies such as surface acoustic wave (SAW), film bulk acoustic resonator (FBAR), bulk acoustic wave (BAW), and the like, reactive components such as inductors and capacitors, and/or other ceramic/cavity resonator topologies and technologies.

Figure 9C:
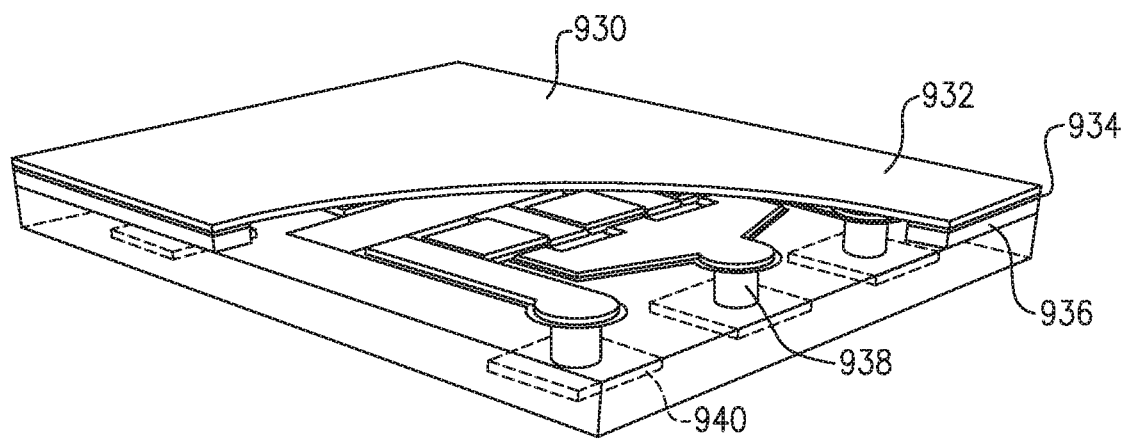
FIG. 9C is an exemplary perspective cut-away view of an embodiment of a surface acoustic wave (SAW) filter, according to certain embodiments.

FIG. 9C is an exemplary perspective cut-away view of an embodiment of a surface acoustic wave (SAW) filter 930. SAW devices utilize the piezoelectric effect to convert energy back and forth between the electrical and mechanical realms where the presence of an electrical field causes the material to deform and the application of a mechanical stress induces an electric charge. The SAW filter 930 is illustrated as a wafer level packaged device and comprises a metal lid 932, a solder seal-ring 934, and a plated wall 936 configured for hermetic wafer level packaging. The SAW filter 930 further comprises a plurality of through-wafer via 938 and a plurality of solder pads 940 configured to provide electrical connections. In an embodiment, each filter 412, 414, 416, 422, 424, 426, 432, 434, 436, 512, 514, 516, 522, 524, 526, 612A, 614A, 616A, 612B, 614B, 616*b* can comprise the SAW filter 930. In another embodiment, each filter 412, 414, 416, 422, 424, 426, 432, 434, 436, 512, 514, 516, 522, 524, 526, 612A, 614A, 616A, 612B, 614B, 616B can be packaged separately as a SAW filter and assembled onto a multi-chip module that includes the switching semiconductor die 920. In a further embodiment, each filter 412, 414, 416, 422, 424, 426, 432, 434, 436, 512, 514, 516, 522, 524, 526, 612A, 614A, 616A, 612B, 614B, 616B can be packaged as a separate part built from piezoelectric material and metal interconnect technology and then assembled onto a multi-chip module alongside the switching die 920, which can be a Si or SOI semiconductor die.

Figure 10A:
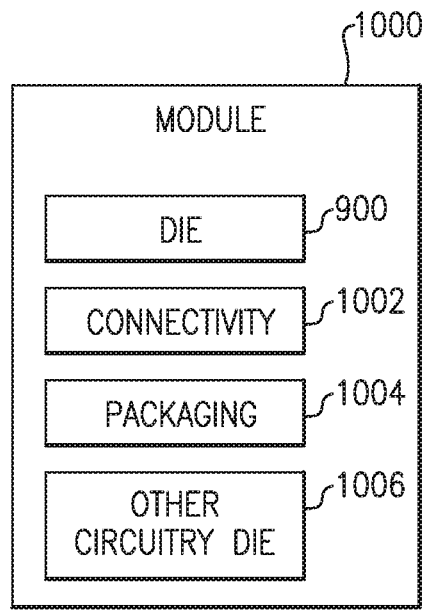
FIG. 10A is an exemplary block diagram of switching module including the multimode semiconductor die of FIG. 9A, according to certain embodiments.
Figure 10B:
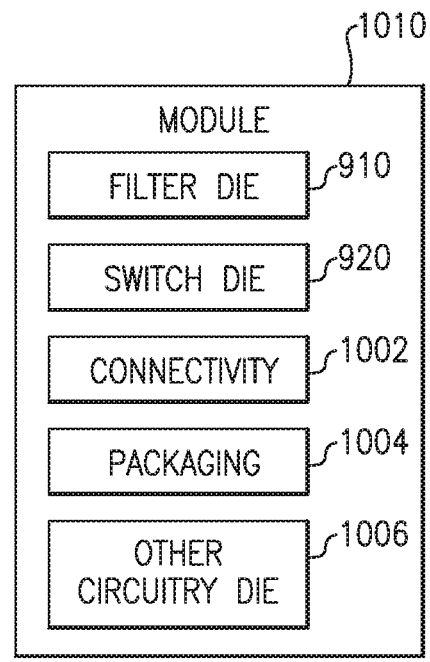
FIG. 10B is an exemplary block diagram of a switching module including the filter and switch semiconductor die of FIG. 9B, according to certain embodiments.

FIG. 10A is an exemplary block diagram of switching module 1000 including the multimode semiconductor die 900 of FIG. 9A. FIG. 10B is an exemplary block diagram of a multi-chip switching module 1010 including the filtering semiconductor die 910 and the switching semiconductor die 920 of FIG. 9B.

Figure 10C:
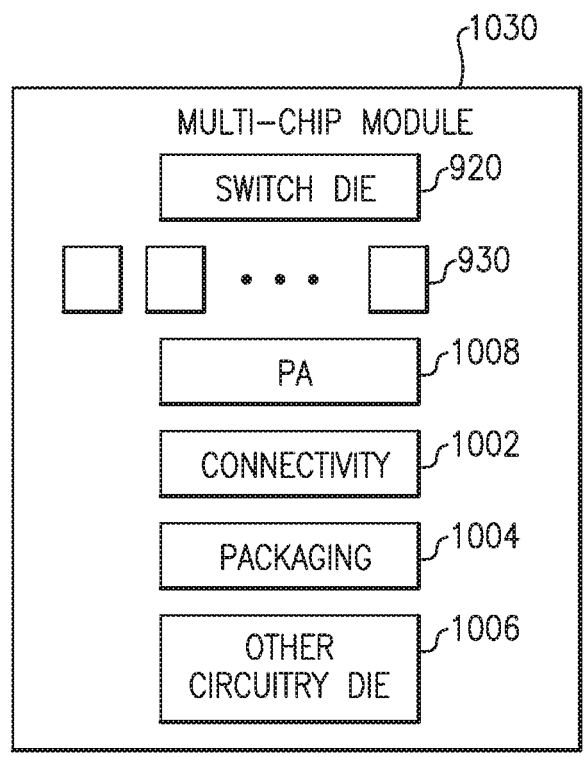
FIG. 10C is an exemplary block diagram of a multi-chip module including a plurality of SAW filters of FIG. 9C, and the filter and switch semiconductor die of FIG. 9B, according to certain embodiments.

FIG. 10C is an exemplary block diagram of a multi-chip switching module 1030 including the switching semiconductor die 920 and a plurality of SAW filters 930. In an embodiment, the multi-chip module 1030 further includes power amplifier (PA) circuitry 1008.

The modules 1000, 1010, 1030 further include connectivity 1002 to provide signal interconnections, packaging 1004, such as for example, a package substrate, for packaging of the circuitry, and other circuitry die 1006, such as, for example amplifiers, pre-filters, post filters modulators, demodulators, down converters, and the like, as would be known to one of skill in the art of semiconductor and multi-chip module fabrication in view of the disclosure herein.

Figure 11:
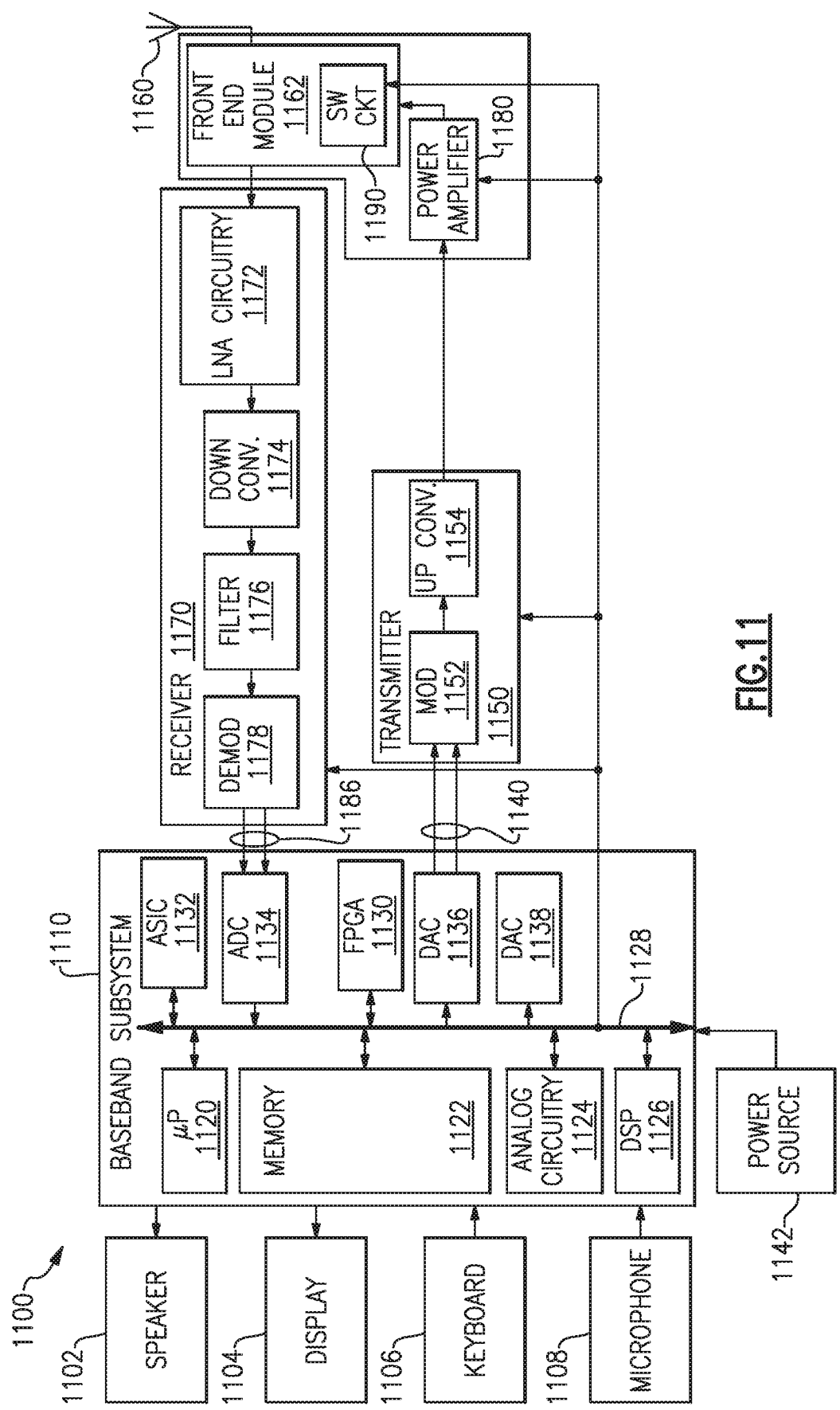
FIG. 11 is an exemplary block diagram illustrating a simplified wireless device including an embodiment of a switching circuit to implement an FDD and TDD shared band, according to certain embodiments.

FIG. 11 is an exemplary block diagram illustrating a simplified wireless device 1100 including an embodiment of the switching and signal conditioning/filtering circuit 400, 500, 600A or 600B configured to switch and condition/filter the RF transmit signal and the RF receive signal in order to implement both FDD and TDD in a shared band.

The wireless device 1100 includes a speaker 1102, a display 1104, a keyboard 1106, and a microphone 1108, all connected to a baseband subsystem 1110. A power source 1142, which may be a direct current (DC) battery or other power source, is also connected to the baseband subsystem 1110 to provide power to the wireless device 1100. In a particular embodiment, the wireless device 1100 can be, for example but not limited to, a portable telecommunication device such as a mobile cellular-type telephone. The speaker 1102 and the display 1104 receive signals from baseband subsystem 1110, as known to those skilled in the art. Similarly, the keyboard 1106 and the microphone 1108 supply signals to the baseband subsystem 1110. The baseband subsystem 1110 includes a microprocessor (µP) 1120, memory 1122, analog circuitry 1124, and a digital signal processor (DSP) 1126 in communication via bus 1128. Bus 1128, although shown as a single bus, may be implemented using multiple busses connected as necessary among the subsystems within the baseband subsystem 1110. The baseband subsystem 1110 may also include one or more of an application specific integrated circuit (ASIC) 1132 and a field programmable gate array (FPGA) 1130.

The microprocessor 1120 and memory 1122 provide the signal timing, processing, and storage functions for wireless device 1100. The analog circuitry 1124 provides the analog processing functions for the signals within baseband subsystem 1110. The baseband subsystem 1110 provides control signals to a transmitter 1150, a receiver 1170, a power amplifier 1180, and a switching module 1190, for example.

It should be noted that, for simplicity, only the basic components of the wireless device 1100 are illustrated herein. The control signals provided by the baseband subsystem 1110 control the various components within the wireless device 1100. Further, the function of the transmitter 1150 and the receiver 1170 may be integrated into a transceiver.

The baseband subsystem 1110 also includes an analog-to-digital converter (ADC) 1134 and digital-to-analog converters (DACs) 1136 and 1138. In this example, the DAC 1136 generates in-phase (I) and quadrature-phase (Q) signals 1140 that are applied to a modulator 1152. The ADC 1134, the DAC 1136, and the DAC 1138 also communicate with the microprocessor 1120, the memory 1122, the analog circuitry 1124, and the DSP 1126 via bus 1128. The DAC 1136 converts the digital communication information within baseband subsystem 1110 into an analog signal for transmission to the modulator 1152 via connection 1140. Connection 1140, while shown as two directed arrows, includes the information that is to be transmitted by the transmitter 1150 after conversion from the digital domain to the analog domain.

The transmitter 1150 includes the modulator 1152, which modulates the analog information on connection 1140 and provides a modulated signal to upconverter 1154. The upconverter 1154 transforms the modulated signal to an appropriate transmit frequency and provides the upconverted signal to the power amplifier 1180. The power amplifier 1180 amplifies the signal to an appropriate power level for the system in which the wireless device 1100 is designed to operate.

Details of the modulator 1152 and the upconverter 1154 have been omitted, as they will be understood by those skilled in the art. For example, the data on connection 1140 is generally formatted by the baseband subsystem 1110 into in-phase (I) and quadrature (Q) components. The I and Q components may take different forms and be formatted differently depending upon the communication standard being employed.

The power amplifier 1180 supplies the amplified signal to a front-end module 1162, where the amplified signal is conditioned and filtered by one or more signal conditioning filters for transmission. The front end module 1162 comprises an antenna system interface that may include, for example, the switching module 1190 comprising an embodiment of the switching and signal filtering circuit 400, 500, 600, or 600A configured to switch a signal between the antenna 1160, the receiver 1170, and the power amplifier 1180 (receiving the RF transmit signal from the transmitter 1150), as described herein to implement FDD and TDD in a shared band. In an embodiment, the PA circuitry 1008 comprises the power amplifier 1180. The RF transmit signal is supplied from the front-end module 1162 to the antenna 1160. In an embodiment, the antenna 1160 comprises an FDD/TDD antenna.

In an embodiment, the front-end module 1162 comprises the switching module 1190. In an embodiment, switching module 1190 comprises the switching module 1000 including the semiconductor die 900. In another embodiment, switching module 1190 comprises the switching module 1010 including the filtering semiconductor die 910 and the switching semiconductor die 920. In a further embodiment, the switching module 1190 comprises the multi-chip module 1030 including one or more SAW filters 930 and the switching semiconductor die 920. In these embodiments, the switching module 1190 comprises an embodiment of the switching and signal filtering circuit 400, 500, 600A, or 600B.

A signal received by antenna 1160 will be directed from the front-end module 1162 to the receiver 1170. The receiver 1170 includes low noise amplifier circuitry 1172, a downconverter 1174, a filter 1176, and a demodulator 1178.

If implemented using a direct conversion receiver (DCR), the downconverter 1174 converts the amplified received signal from an RF level to a baseband level (DC), or a near-baseband level (approximately 100 kHz). Alternatively, the amplified received RF signal may be downconverted to an intermediate frequency (IF) signal, depending on the application. The downconverted signal is sent to the filter 1176. The filter 1176 comprises a least one filter stage to filter the received downconverted signal as known in the art.

The filtered signal is sent from the filter 1176 to the demodulator 1178. The demodulator 1178 recovers the transmitted analog information and supplies a signal representing this information via connection 1186 to the ADC 1134. The ADC 1134 converts these analog signals to a digital signal at baseband frequency and transfers the signal via bus 1128 to the DSP 1126 for further processing.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize in view of the disclosure herein.

For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A switching circuit for use in a frequency division duplex spectrum re-allocated for time division duplex application, the switching circuit comprising:
   a duplex filter configured to filter first signals including frequency and time division duplex receive and transmit signals in a reallocated transmit band;
   a gap filter configured to filter time division duplex receive and transmit signals in a reallocated duplex gap band between the reallocated transmit band and a receive band; and
   a plurality of switches configured to route the first signals to and from an antenna, respectively, through at least one of the duplex filter and the gap filter the first signals sharing the reallocated transmit band that includes separate sub-bands including a first sub-band allocated for frequency division duplex transmission, a second sub-band allocated for time division duplex transmission and reception, a third sub-band allocated for frequency division duplex transmission, the reallocated duplex gap band including first and second dual-use bands and a fourth sub-band interposed therebetween and allocated for time division duplex transmission and reception, the dual-use bands configured as one of a guard band or a time division duplex band based at least in part on a received signal strength indication.

2. The switching circuit of claim 1 wherein the duplex filter includes a surface acoustic wave filter.

3. The switching circuit of claim 1 wherein the duplex filter includes a band pass filter.

4. The switching circuit of claim 1 wherein the duplex filter includes a film bulk acoustic resonator filter.

5. The switching circuit of claim 1 wherein the duplex filter includes a bulk acoustic wave filter.

6. The switching circuit of claim 1 wherein the reallocated transmit band further includes a fifth sub-band interposed between the first and second sub-bands, the fifth sub-band configured to operate as a guard band when signal interference between the first sub-band and the second sub-band is greater than a threshold.

7. The switching circuit of claim 6 wherein the fifth sub-band is allocated for time division duplex transmission when the signal interference between the first sub-band and the second sub-band is less than the threshold.

8. A switching module for use in a frequency division duplex spectrum re-allocated for time division duplex application, the switching module comprising:
   a switching circuit implemented in a first semiconductor die, the switching circuit including a duplex filter configured to filter first signals including frequency and time division duplex receive and transmit signals in a reallocated transmit band, a gap filter configured to filter time division duplex receive and transmit signals in a reallocated duplex gap band between the reallocated transmit band and a receive band, and a plurality of switches configured to route the first signals to and from an antenna, respectively, through at least one of the duplex filter and the gap filter, the first signals sharing the reallocated transmit band that includes separate sub-bands including a first sub-band allocated for frequency division duplex transmission, a second sub-band allocated for time division duplex transmission and reception, a third sub-band allocated for frequency division duplex transmission, the reallocated duplex gap band including first and second dual-use bands and a fourth sub-band interposed therebetween and allocated for time division duplex transmission and reception, the dual-use bands configured as one of a guard band or a time division duplex band based at least in part on a received signal strength indication; and
   at least one of a prefilter circuit, a post filter circuit, a power amplifier circuit, a switch circuit, a down converter circuit, and a modulator circuit implemented in a second semiconductor die.

9. The switching module of claim 8 wherein the duplex filter includes a surface acoustic wave filter.

10. The switching module of claim 8 wherein the duplex filter includes a band pass filter.

11. The switching module of claim 8 wherein the duplex filter includes a film bulk acoustic resonator filter.

12. The switching module of claim 8 wherein the duplex filter includes a bulk acoustic wave filter.

13. The switching module of claim 8 wherein the reallocated transmit band further includes a fifth sub-band interposed between the first and second sub-bands, the fifth sub-band configured to operate as a guard band when signal interference between the first sub-band and the second sub-band is greater than a threshold.

14. The switching module of claim 13 wherein the fifth sub-band is allocated for time division duplex transmission when the signal interference between the first sub-band and the second sub-band is less than the threshold.

15. The switching module of claim 8 wherein the third sub-band configured to operate as one of a guard band and an uplink for time division duplex receive signals.

16. A method to transmit and receive frequency division duplex signals and time division duplex signals in a frequency division duplex and time division duplex shared frequency band, the method comprising:
   routing first signals including frequency and time division duplex transmit and receive signals to and from an antenna, respectively, through at least one of a duplex filter and a gap filter,
   filtering with the duplex filter the first signals in a reallocated transmit band;
   filtering with the gap filter time division duplex receive and transmit signals in a reallocated duplex gap band between the reallocated transmit band and a receive band, the first signals sharing the reallocated transmit that includes separate sub-bands including a first sub-band allocated for frequency division duplex transmission, a second sub-band allocated for time division duplex transmission and reception, a third sub-band allocated for frequency division duplex transmission, the reallocated duplex gap band including first and second dual-use bands and a fourth sub-band interposed therebetween and allocated for time division duplex transmission and reception; and
   configuring the dual-use bands as one of a guard band or a time division duplex band based at least in part on a received signal strength indication.

17. The method of claim 16 wherein the duplex filter includes a film bulk acoustic resonator filter.

18. The method of claim 16 wherein the duplex filter includes a bulk acoustic wave filter.

19. The method of claim 16 wherein the reallocated transmit band further includes a fifth sub-band interposed between the first and second sub-bands, the fifth sub-band configured to operate as a guard band when signal interference between the first sub-band and the second sub-band is greater than a threshold.

20. The method of claim 19 wherein the fifth sub-band is allocated for time division duplex transmission when the signal interference between the first sub-band and the second sub-band is less than the threshold.

* * * * *

UNITED STATES PATENT AND TRADEMARK OFFICE
CERTIFICATE OF CORRECTION

PATENT NO. : 10,644,861 B2
APPLICATION NO. : 15/831713
DATED : May 5, 2020
INVENTOR(S) : David Richard Pehlke Page 1 of 1

It is certified that error appears in the above-identified patent and that said Letters Patent is hereby corrected as shown below:

In the Specification

In Column 8, Line 43, delete "416 432," and insert --416, 432,--.

In Column 18, Line 25, delete "616b" and insert --616B--.

In Column 20, Line 27, delete "6008." and insert --600B.--.

In Column 20, Line 54, delete "connected"," and insert --"connected",--.

In the Claims

In Column 23, Line 25, Claim 16, delete "that" and insert --band that--.

Signed and Sealed this
Fourth Day of August, 2020

Andrei Iancu
*Director of the United States Patent and Trademark Office*